(12) United States Patent
Strathmann

(10) Patent No.: US 8,048,826 B1
(45) Date of Patent: Nov. 1, 2011

(54) METHODS FOR COMBINATORIAL SYNTHESIS ON ARRAYS

(76) Inventor: Michael Paul Strathmann, Seattle, WA (US)

( * ) Notice: Subject to any disclaimer, the term of this patent is extended or adjusted under 35 U.S.C. 154(b) by 1124 days.

(21) Appl. No.: 11/426,913

(22) Filed: Jun. 27, 2006

Related U.S. Application Data

(60) Provisional application No. 60/695,700, filed on Jun. 28, 2005.

(51) Int. Cl.
*C40B 50/00* (2006.01)
(52) U.S. Cl. ............... 506/23; 506/7; 506/13; 435/6
(58) Field of Classification Search .............. None
See application file for complete search history.

(56) References Cited

U.S. PATENT DOCUMENTS 6,093,302 A * 7/2000 Montgomery ............... 205/122
2004/0238369 A1 * 12/2004 Southern et al. ............ 205/122

* cited by examiner

*Primary Examiner* — Jeffrey S. Lundgren

(57) ABSTRACT

The present invention provides methods for synthesizing arrays of polymers. The polymers are synthesized from monomers through a series of synthesis steps at chemically-modified electrodes by the action of an electrochemically generated reagent (EGR) at subsets of the electrodes. These subsets of electrodes vary with each step. Crosstalk of the EGR between electrodes is prevented by the production of a scavenging agent, which neutralizes the EGR, at those electrodes where the EGR is not produced. The scavenging agent acts as a "virtual cap" to prevent mis-incorporation of monomers and other anomalies in the polymers.

9 Claims, No Drawings

METHODS FOR COMBINATORIAL SYNTHESIS ON ARRAYS

RELATED APPLICATION DATA

This application claims benefit of U.S. Provisional Patent Application Ser. No. 60/695,700, filed Jun. 28, 2005.

FIELD OF THE INVENTION

The present invention is directed to the synthesis and placement of materials at select locations on a substrate. In particular, the present invention is directed to a method for providing separate sequences of chemical monomers at select locations on a substrate.

BACKGROUND

A variety of methods are currently available for making arrays of biological macromolecules, such as arrays of nucleic acid molecules or proteins. One method for making ordered arrays of DNA on a porous membrane is a "dot blot" approach. In this method, a vacuum manifold transfers a plurality, e.g., 96, aqueous samples of DNA from 3 millimeter diameter wells to a porous membrane. A common variant of this procedure is a "slot-blot" method in which the wells have highly-elongated oval shapes. The DNA is immobilized on the porous membrane by baking the membrane or exposing it to UV radiation. This is a manual procedure practical for making one array at a time and usually limited to 96 samples per array. "Dot-blot" procedures are therefore inadequate for applications in which many thousand samples must be determined.

An alternate method of creating ordered arrays of nucleic acid sequences is described by Pirrung, et al. (U.S. Pat. No. 5,143,854, 1992), and also by Fodor, et al. (Science 251:767-773, 1991). The method involves synthesizing different nucleic acid sequences at different discrete regions of a support. This method employs elaborate synthetic schemes, and is generally limited to relatively short nucleic acid samples, e.g., less than 20 bases. A related method has been described by Southern, et al. (Genomics 13:1008-1017, 1992).

Montgomery (U.S. Pat. No. 6,093,302, 2000) teaches a method for making arrays of polymers by employing electrochemically generated reagents that are confined by scavenging/buffering agents. Synthesis of the polymers occurs on a microarray of chemically-modified electrodes by passing current through subsets of the electrodes (the active electrodes) to produce the electrochemically-generated reagents (EGR) locally, near the electrodes. The scavenging agent is present in solution prior to passing current through the electrodes. The concentration of this scavenging agent must be carefully balanced so that it does not prevent synthesis locally at the desired subset of electrodes but can eliminate any unwanted reactions at the remaining electrodes where subsequent rounds of synthesis will occur (the passive electrodes). As the density of electrodes increases, the distance between active and passive electrodes decreases, and the proper balance of EGR and scavenger becomes problematic. This balance is best understood as a high concentration of EGR near the active electrodes and a high concentration of scavenger at some distance from these electrodes. In between these two areas of high concentration will be a gradient of the two, opposing agents. This gradient is established solely by the active electrode since the scavenger is present in solution everywhere at a fixed concentration prior to passing current. It is expected that partial synthesis could occur in this gradient zone. As electrode densities increase, the passive electrodes could fall within this zone, thereby leading to unwanted reactions and poor overall synthesis.

Southern & Egeland (U.S. patent application Ser. No. 10/488,058) describe an electrochemical method for producing microarrays that utilizes an array of electrodes but differs from Montgomery (U.S. Pat. No. 6,093,302, 2000) in several important ways. First, the electrodes are thin lines (0.75 cm×40 um) and do not behave as approximate point sources like true microelectrodes do. This electrode configuration only allows the synthesis of polymers (e.g. oligonucleotides) with highly constrained sequences of monomers. That is, one cannot synthesize a microarray (~40 um×40 um feature size) with any sequence of monomers at any position in the array. Second, the electrochemical reactions that produce the microarray are physically limited to a thin layer of solvent (~40 um) over the surface of the array substrate. This limitation imposes complicated mechanical requirements on fluid delivery of synthesis reagents to the microarray. Third, a scavenger is used to confine the reaction to the active electrodes in a manner analogous to Montgomery (U.S. Pat. No. 6,093,302, 2000). However, Southern & Egeland (U.S. patent application Ser. No. 10/488,058) produce this scavenger by electrochemical means at electrodes on the array that surround the active electrodes. In effect, these "surrounding electrodes" produce a wall of the scavenging agent that neutralizes the EGR thereby preventing the EGR from diffusing to the passive electrodes. The requirement for surrounding electrodes limits the geometry of the electrode array.

Montgomery (U.S. Pat. No. 6,093,302, 2000) also describes the use of a second set of electrodes, called the "getter" structure, which functions actively to scavenge the EGR. This function is performed by applying sufficient potential to the "getter" structure to cause electrochemical scavenging. The "getter" structure is distinct from those electrodes where synthesis occurs. Similar to Southern & Egeland (U.S. patent application Ser. No. 10/488,058), the "getter" structure is a "surrounding" electrode and prevents the EGR made at the active electrodes from reaching the passive electrodes. Montgomery describes the preferred form of the "getter" structure as "ring" electrodes that surround the electrodes where synthesis occurs. This separate "getter" structure adds complexity to the array design, and limits the geometry of the electrode array thereby impacting its achievable density.

There is a need in the art for a method of synthesizing flexible configurations of polymers by electrochemical means on high density arrays of chemically-modified electrodes. The current invention addresses this need by using electrochemical means to generate the scavenging agent at the passive electrode. In this way, a "virtual cap" is created directly over the passive electrodes thereby preventing the EGR from causing unwanted reactions.

DETAILED DESCRIPTION OF THE INVENTION

The present invention provides methods for the combinatorial synthesis of polymers and other compounds on arrays by electrochemical means. The polymers are preferably synthesized on arrays of chemically-modified electrodes. The process of making an array of polymers comprises a discrete series of synthesis steps wherein each step comprises the coupling of a particular monomer (a coupling event) at a subset of electrodes in the array. Since different monomers may be coupled at different subsets of electrodes during subsequent synthesis steps, a different polymer can be synthesized at each electrode. This process is described in detail by Montgomery (U.S. Pat. No. 6,093,302, 2000), Southern (U.S.

Pat. No. 5,667,667) and Southern & Egeland (U.S. patent application Ser. No. 10/488,058), which are hereby incorporated in their entirety.

A synthesis step may comprise multiple sub-steps. At least one sub-step, defined as the echem step, comprises the production of an electrochemically-generated reagent (EGR), which occurs at the active electrodes. The remaining electrodes at which the EGR is not produced during a synthesis step are defined as the passive electrodes for that step. Note, the active and passive electrodes are determined by a synthesis step and will change in subsequent steps. That is, each electrode at which a polymer is synthesized will be active in certain synthesis steps and passive in other synthesis steps.

The production of EGR determines which electrodes will participate in a productive coupling event. Typically, EGR diffuses from the active electrode. Diffusion to the location of a passive electrode may lead to, for example, an unwanted coupling event which could result in poor yields of the correct polymers at the desired locations in the array. The problem of diffusion of EGR from the active electrodes to the passive electrodes, defined as "crosstalk", can be overcome by generating a scavenging agent during the echem step at the passive electrodes or at a subset of the passive electrodes near the active electrodes. A scavenging agent is defined as a reagent that neutralizes, completely or partially, the activity of the EGR in the synthesis reaction. For example, a buffer may scavenge acid or a reducing agent may scavenge an oxidizing agent. Note, the EGR "directly influences" (or equivalently "determines") a coupling event whereas the scavenging agent indirectly influences the coupling event by counteracting the activity of the EGR. In other words, the EGR influences a coupling event even in the absence of the electrochemically-generated scavenging agent. Electrochemical generation of the scavenging agent at the passive electrodes simplifies the array design by eliminating specialized electrodes where no productive synthesis occurs. The "getter" structure described by Montgomery (U.S. Pat. No. 6,093,302, 2000) is one example of these specialized electrodes. Importantly, production of the scavenging agent at the passive electrodes places the highest concentration of the scavenger where it is most needed, e.g. where a coupling event that is catalyzed by the EGR would lead to the mis-incorporation of a monomer thereby disrupting the correct sequence of monomers in the polymer. In effect, production of the scavenger at a passive electrode places a "virtual cap" over the electrode, preventing in this case the coupling step from occurring at the passive electrode.

During the echem step a least two different electrochemical reactions are occurring: one reaction at the active electrodes to produce the EGR and the second reaction at the passive electrodes to produce a scavenger. The two reactions may not be electrically balanced, in which case a third electrode may be required (a counter electrode) so that electrical neutrality is maintained (i.e., the rate of oxidation equals the rate of reduction). This third electrode may be separated from the array of electrodes or it may be integral. It could even be a "surrounding" electrode analogous to the structures described by Montgomery (U.S. Pat. No. 6,093,302, 2000) and Southern & Egeland (U.S. patent application Ser. No. 10/488,058). Of course, the "virtual cap" method described in the instant specification may be coupled with the methods described by Montgomery and/or Southern & Egeland (U.S. patent application Ser. No. 10/488,058).

The two electrochemical reactions at the active and passive electrodes may occur simultaneously or they may occur separately (e.g., pulsing). The EGR and scavenger must be chosen so that the polymers being synthesized at the coupling electrodes are not irreversibly damaged by these reagents.

An illustrative example is the synthesis of oligonucleotides on an array of chemically-modified electrodes. One step in the synthesis process, called the deblock step, involves the removal of a protecting group (the dimethoxy trityl group) by acid to produce a hydroxyl group. The hydroxyl group is reacted with a phosphoramidite in a subsequent step to couple a new nucleotide to the "growing" oligonucleotide. This process is described by both Montgomery (U.S. Pat. No. 6,093, 302, 2000) and Southern (U.S. Pat. No. 5,667,667). The addition of a nucleotide can be limited to the oligonucleotides at a subset of the electrodes by generating the acid electrochemically at this subset (the active electrodes). Concurrently, a base or other proton scavenger can be electrochemically generated at the remaining (passive) electrodes in the array. Alternatively, the base may be generated only at those passive electrodes adjacent the active electrodes. A large body of literature exists for the electrochemical generation of both acids (EGA, see for example Uneyama, K., Topics Current Chem, 142:167-188, 1987) and bases (EGB, see for example Utley, J. H. P., Topics Current Chem, 142:131-165, 1987).

Southern & Egeland (U.S. patent application Ser. No. 10/488,058) describes one example of an EGA in which hydroquinone is oxidized in acetonitrile to generate protons and an oxidized form of hydroquinone, perhaps benzoquinone. Other examples of EGA's include oxidation of diphenyl hydrazine, oxidation of a variety of thiols to yield protons and disulphides, oxidation of analogues of pyrrole, thiophene and other monomers to yield protons and dimers, etc. These acids are potentially very strong and could damage the growing oligonucleotide by depurination or other means. A very weak base may be included in the solvent in order to limit the acidity of the protons in solution. This base is far weaker than the EGB. A good base when fully protonated in the solvent will perform like trichloroacetic acid (TCA) in dichloromethane (DCM). TCA in DCM is the reagent used in the deblock step during the standard, chemical synthesis of oligonucleotides, and this reagent is known to cause only acceptable levels of depurination. Examples of such weak bases in acetonitrile are readily found in the literature (see for example, Yagupolski, L. M., J. Chem. Soc., Perkin Trans. 2:1950-1955, 2002 and Kaljurand, I. J. Org. Chem., 65:6202-6208, 2000).

Examples of EGB's include the reduction of benzoquinone in acetonitrile to generate a radical anion that will scavenge protons (Southern & Egeland (U.S. patent application Ser. No. 10/488,058)). Other examples are readily found in the literature (see for example Utley, J. H. P., Topics Current Chem, 142:131-165, 1987). Again, this EGB must be chosen so that it does not appreciably damage the growing polymer (e.g., oligonucleotide). To practice the instant invention, an array of individually addressable electrodes is preferred. Methods for making arrays of individually addressable electrodes are well known in the art (see for example, Montgomery, D. D., U.S. Pat. No. 6,093,302; Teoule, R. et al., U.S. Pat. No. 5,837,859; Havens, J. R. et al., U.S. Pat. No. 6,306,348).

Microlithography techniques have been used to make arrays with 1000 addressable electrodes (Caillat, P. et al., Sens. Actuators B, 61:154-162, 1999). Arrays with greater than 100,000 electrodes can be constructed, and the electrodes can be less than 1 µM in diameter (Montgomery, D. D., U.S. Pat. No. 6,093,302). Methods for chemically modifying electrodes are also well known (Fujihira, M., Topics in Organic Chemistry, Plenum, 255-294, 1986). The modified electrodes ("functionalized electrodes") provide functional groups on which solid-phase synthesis can occur (e.g.

hydroxyl groups for oligonucleotide synthesis, etc.). For example, chlorosilane and alkoxysilane reagents will react with surface hydroxyls on metal oxide electrodes (e.g., $RuO_2$, doped $SnO_2$, doped $TiO_2$, doped $InO_2$, etc.) and partially oxidized metal electrodes (e.g., platinum, etc.) to provide a variety of functional groups tethered to the electrode by a linker moiety (Murray, R. W., Techniques of Chemistry, Vol. 22, John Wiley & Sons, 1-48, 1992). A wide variety of conducting polymers (e.g. polypyrrole, polyaniline, polythiophene, etc.) with pendant functional groups can be electrochemically deposited on electrodes (Chandrasekhar, P., Conducting Polymers: Fundamentals & Applications, Kluwer, 1999). Composite materials, consisting of a conducting component (e.g. metal, conducting polymer, conducting metal oxide, etc.) and a particulate functionalized component (e.g. $SiO_2$, polystyrene beads, $TiO_2$, etc.) may be electrochemically codeposited on electrodes (Ferreira, C. A. et al., J. Appl. Electrochem. 31:49-56, 2001; Gangopadhyay, R. & De, A., Chem. Mater., 12:608-622, 2000; Musiani, M., Electrochim. Acta, 45:3397-3402, 2000; and Hovestad, A. et al., J. Appl. Electrochem., 29:331-338, 1999). A variety of polymers (e.g. acrylate/polyvinyl alcohol, polysaccharides, polyacrylamides, etc.) may be cast over the entire array of electrodes (Bard, A. J. & Faulkner, L. R., Electrochemical Methods, John Wiley & Sons, 580-589, 2001; Montgomery, D. D., U.S. Pat. No. 6,093,302). Clays, zeolites and other porous structures, such as CPG and sol-gel materials may be coated over the array of electrodes to provide functional groups (Montgomery, D. D., U.S. Pat. No. 6,093,302; Bard, A. J. & Faulkner, L. R., Electrochemical Methods, John Wiley & Sons, 580-589, 2001; Bard, A. J. & Mallouk, T., Techniques of Chemistry, John Wiley & Sons, 271-312, 1992; Havens, J. R. et al., U.S. Pat. No. 6,306,348). Non-conducting material at the perimeter of the electrode may provide the functionalized groups for synthesis, and yields an arrangement also defined as a functionalized electrode. For example, silicon dioxide is a common dielectric that can be place between separate electrodes. The silicon dioxide can be functionalized using many reagents that are more commonly used to functionalized glass slides. Electrochemical synthesis can occur on the functionalized silicon dioxide near each electrode.

It is contemplated that the methods described herein may be applied to the combinatorial synthesis of compounds and materials in which components of each compound or material may be added in a step-wise fashion to produce the compound or material. Examples include polymers such as for example oligonucleotides and peptides, branching polymers, small molecules, composite materials, etc. It is further contemplated that the chemical modification of electrodes will vary depending on the compound or material to be synthesized. In some cases, an unmodified electrode (e.g., pure platinum) may suffice to practice the invention, if for example the material adheres to the unmodified electrode. It is understood the instant invention may be used in combination with other strategies for the combinatorial synthesis of compounds and materials. For example, a buffering/scavenging agent as described by Montgomery (U.S. Pat. No. 6,093,302, 2000) may be utilized in addition to the "virtual cap".

I claim:

1. A method for combinatorial synthesis on an array of electrodes by the inhibition of crosstalk between active and passive electrodes, comprising
    (a) producing an electrochemically-generated reagent at the active electrodes; and
    (b) producing an electrochemically-generated scavenging agent at one or more of the passive electrodes.

2. The method of claim 1 wherein the array comprises chemically-modified electrodes comprising one or more functional groups.

3. The method of claim 2 wherein the electrochemically-generated reagent determines the coupling of monomers having one or more functional groups to the functional groups at the electrodes.

4. The method of claim 3 further comprising step (c) coupling the monomers to the functional groups at the electrodes.

5. The method of claim 4 further comprising step (d) repeating steps (a) through (c) to synthesize polymers comprising the monomers.

6. The method of claim 4 wherein the polymers are oligonucleotides.

7. The method of claim 6 wherein the electrochemically-generated reagent is an acid and the monomers are phosphoramidites.

8. The method of claim 7 wherein the acid is produced by the oxidation of hydroquinone.

9. The method of claim 8 wherein the scavenging agent is a reduced quinone.

* * * * *